(12) United States Patent
Behara et al.

(10) Patent No.: US 12,354,138 B2
(45) Date of Patent: Jul. 8, 2025

(54) SYSTEMS AND METHODS FOR UTILIZING AUGMENTED REALITY AND VOICE COMMANDS TO CAPTURE AND DISPLAY PRODUCT INFORMATION

(71) Applicant: Verizon Patent and Licensing Inc., Basking Ridge, NJ (US)

(72) Inventors: Chaitanya Kumar Behara, Andhra Pradesh (IN); Saurava Singh, Hyderabad (IN); Gopal K. Mandava, Centerville, VA (US); Jyoti Kumari, Patna (IN); Pankaj Rai, Mania Mirzabad (IN); Sudhindra K. Kumar, Chennai (IN); Manu Bhatia, Hyderabad (IN); Abhishek Malhotra, Hyderabad (IN); Sundaresan Gnanasekaran, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 526 days.

(21) Appl. No.: 17/564,497

(22) Filed: Dec. 29, 2021

(65) Prior Publication Data
US 2023/0206288 A1    Jun. 29, 2023

(51) Int. Cl.
| | | |
|---|---|---|
| *G06Q 30/0282* | (2023.01) | |
| *G06N 20/00* | (2019.01) | |
| *G06T 19/00* | (2011.01) | |
| *G06T 19/20* | (2011.01) | |
| *G06V 10/70* | (2022.01) | |
| *G06V 20/20* | (2022.01) | |

(Continued)

(52) U.S. Cl.
CPC ......... *G06Q 30/0282* (2013.01); *G06N 20/00* (2019.01); *G06T 19/006* (2013.01); *G06T 19/20* (2013.01); *G06V 10/70* (2022.01); *G06V 20/20* (2022.01); *G06V 40/174* (2022.01); *G06V 40/20* (2022.01); *G10L 15/08* (2013.01); *G10L 15/26* (2013.01); *G10L 2015/088* (2013.01)

(58) Field of Classification Search
CPC ........... G06Q 30/0282; G06Q 30/0631; G06Q 30/0643; G06F 3/048; G06N 20/00; G06T 19/006; G06T 19/20; G06V 10/70; G06V 20/20; G06V 40/174; G06V 40/20; G10L 15/08; G10L 15/26; G10L 2015/088
See application file for complete search history.

(56) References Cited

U.S. PATENT DOCUMENTS

| | | | |
|---|---|---|---|
| 8,660,910 B1 * | 2/2014 | Rajyaguru | G06Q 30/0629 705/26.1 |
| 2016/0267377 A1 * | 9/2016 | Pan | G06F 40/30 |

(Continued)

*Primary Examiner* — Dennis W Ruhl

(57) ABSTRACT

A user device may receive, from a server device, a three-dimensional model of a product, and may display the three-dimensional model of the product, with a product review option, in an augmented reality user interface. The user device may display a product feature review panel, product review features, and product feature hotspots, with the three-dimensional model in the augmented reality user interface, based on selection of the product review option. The user device may receive a review of a product feature, via one of the product feature hotspots associated with the product feature and provided in the augmented reality user interface, and may submit the review of the product feature to the server device.

20 Claims, 12 Drawing Sheets

(51) Int. Cl.
*G06V 40/16* (2022.01)
*G06V 40/20* (2022.01)
*G10L 15/08* (2006.01)
*G10L 15/26* (2006.01)

(56) References Cited

U.S. PATENT DOCUMENTS

2017/0357417 A1* 12/2017 Goossens ............ G06F 3/04883
2019/0333118 A1* 10/2019 Crimmins ............... G06F 40/30
2020/0073532 A1*  3/2020 Sakai ..................... G06F 30/00

* cited by examiner

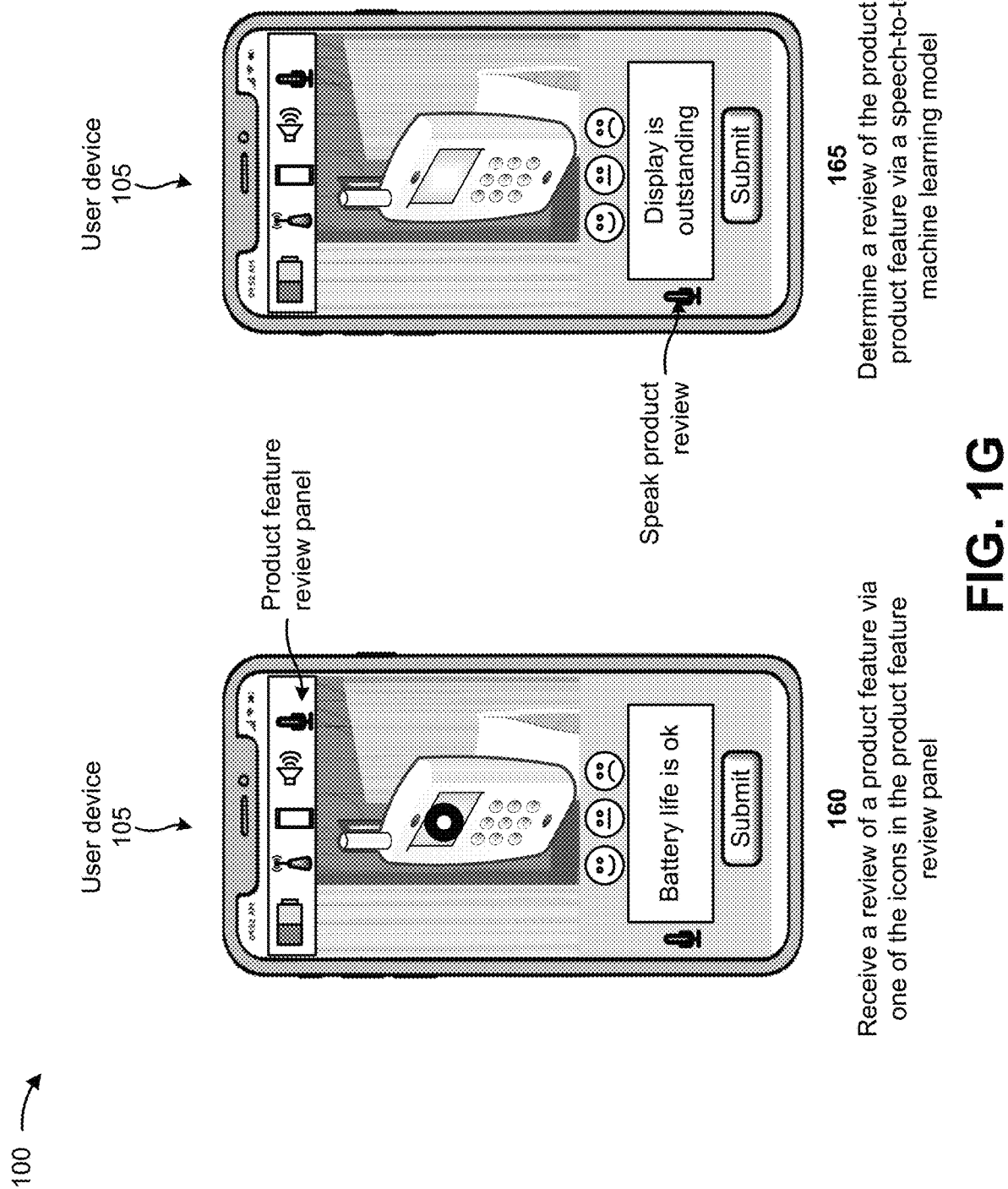

SYSTEMS AND METHODS FOR UTILIZING AUGMENTED REALITY AND VOICE COMMANDS TO CAPTURE AND DISPLAY PRODUCT INFORMATION

BACKGROUND

A product review (e.g., feedback, ratings, and/or the like) is a report about a product written by a customer on a commercial website. The product review may aid potential customers in deciding whether they want to buy the product.

BRIEF DESCRIPTION OF THE DRAWINGS

FIGS. 1A-1I are diagrams of an example associated with utilizing augmented reality and voice commands to capture and display product reviews.

DETAILED DESCRIPTION OF EXAMPLE EMBODIMENTS

Figure 1A:
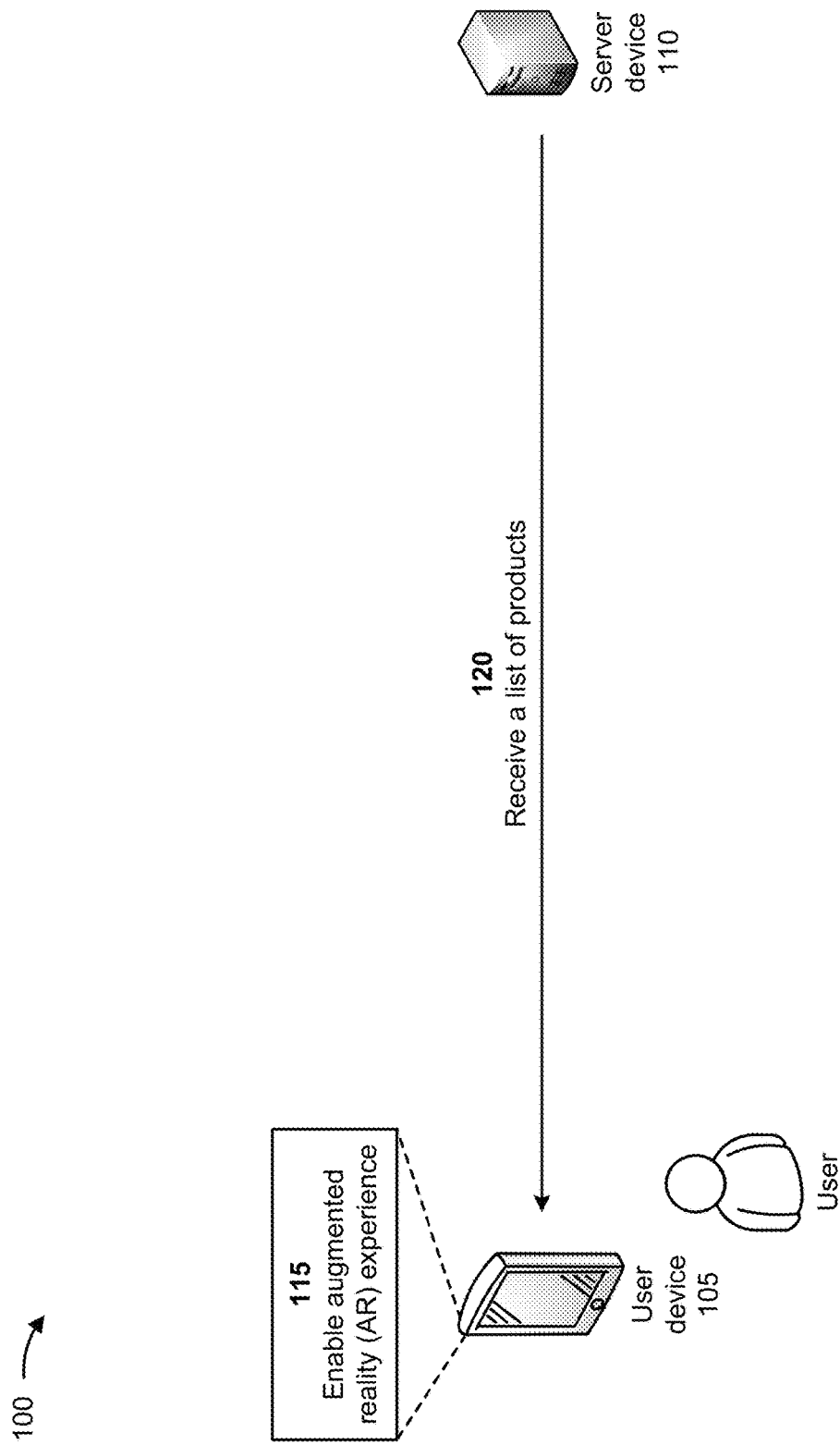

The following detailed description of example implementations refers to the accompanying drawings. The same reference numbers in different drawings may identify the same or similar elements.

Current mechanisms for providing information about products, such as product reviews to commercial websites require a user (e.g., a customer) to input information about a product as whole. However, the current mechanisms do not enable the user to provide reviews for individual components (e.g., a camera, a display, and/or the like) of the product (e.g., a smartphone). Furthermore, entering the information about the product with the current mechanisms may be a time-consuming, frustrating, and tedious process for the user. This may result in the user providing a product review that is unhelpful to other individuals, such as other customers or potential customers. Thus, current mechanisms for providing product reviews consume computing resources (e.g., processing resources, memory resources, communication resources, and/or the like), networking resources, and/or other resources associated with the user inputting the information about the product, searching for and failing to locate useful product reviews about the product, providing product reviews that are not useful, and/or the like.

Some implementations described herein provide a user device that utilizes augmented reality (e.g., a system that incorporates a combination of real and virtual worlds, real-time interaction, and accurate three-dimensional (3D) registration of virtual and real objects) and other inputs, such as voice commands to capture and display product reviews. For example, the user device may receive, from a server device, a three-dimensional model of a product, and may display the three-dimensional model of the product, with a product review option, in an augmented reality user interface. The user device may display a product feature review panel, product review features, and product feature hotspots, with the three-dimensional model in the augmented reality user interface, based on selection of the product review option. The user device may receive a review of a product feature, via one of the product feature hotspots associated with the product feature and provided in the augmented reality user interface, and may submit the review of the product feature to the server device.

In this way, the user device utilizes augmented reality and voice commands to capture and display product reviews. For example, the user device may provide augmented reality (AR) functionality that enables the user to see other customers' product reviews and to and dynamically generate product reviews via voice commands, face gestures, hand gestures, and/or the like. The user device may display such product reviews using augmented reality with a display component of the user device. The user device may enable a user to interact with 3D models of the products, displayed in augmented reality, by using face gestures, voice commands, and/or the like. Thus, the user device may conserve computing resources, networking resources, and/or other resources that would have otherwise been consumed by the user typing in the information about the product, searching for and failing to locate useful product reviews about the product, providing product reviews that are not useful, and/or the like.

FIGS. 1A-1I are diagrams of an example 100 associated with utilizing augmented reality to capture and display product reviews. As shown in FIGS. 1A-1I, the example 100 includes a user device 105 associated with a server device 110. Further details of the user device 105 and the server device 110 are provided elsewhere herein. Although implementations described herein relate to products, the implementations may also be applicable to services, such as an e-commerce service, a cloud computing service, a digital streaming service, an artificial intelligence service, and/or the like.

As shown in FIG. 1A, and by reference number 115, the user device 105 may enable an augmented reality experience. For example, the user device 105 can be any device that supports augmented reality and includes a built-in camera or an external camera, such as a smartphone, a laptop computer, a tablet computer, an augmented reality headset, a virtual reality headset, and/or the like. In some implementations, the user device 105 may support augmented reality and an augmented reality experience (e.g., a service). Alternatively, if the user device 105 fails to support augmented reality, the user may cause the user device 105 to download augmented reality frameworks, libraries, and/or the like before using the augmented reality experience.

As further shown in FIG. 1A, and by reference number 120, the user device 105 may receive a list of products from the server device 110. For example, providing 3D models of products to the user device 105 (e.g., by the server device 110) may be time-consuming and require a large quantity of bandwidth. Therefore, the server device 110 may provide a list of the products to the user device 105 instead of the 3D models of the products. The list of the products may include names of the products, images of the products, descriptions of the products, and/or the like. In some implementations, the user device 105 may request the list of the products (e.g., via a search engine), and may receive the list of the products from the server device 110 based on the request. In some implementations, the user device 105 may navigate to a web page provided by the server device 110, and may receive the list of the products from the server device 110 via the web page.

Figure 1B:
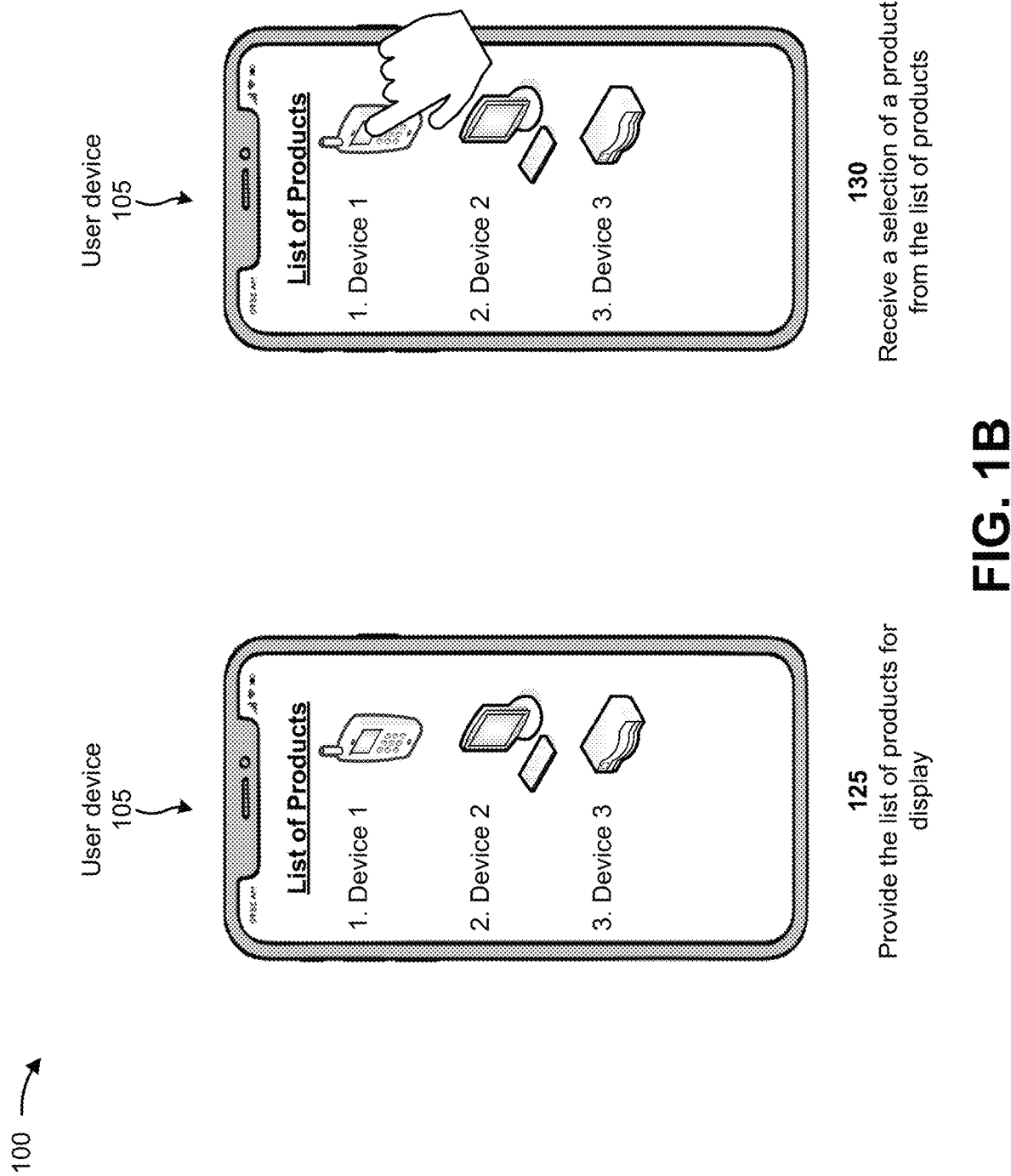

As shown in FIG. 1B, and by reference number 125, the user device 105 may provide the list of products for display. For example, the list of products may include a list of devices, such as, for example, a smartphone, a computing device, a network device, and/or the like. The user device 105 may display the list of devices on a display screen of the user device 105. The list of devices may include names of the devices (e.g., Device 1, Device 2, and Device 3), images of the devices, descriptions of the devices, and/or the like. The names of the devices, the images of the devices, the descriptions of the devices, and/or the like may be selectable via the display screen or a selection device (e.g., a mouse, a trackball, and/or the like) of the user device 105.

As further shown in FIG. 1B, and by reference number 130, the user device 105 may receive a selection of a product from the list of products. For example, the user may utilize the user device 105 to select a product (e.g., a device, such as the smartphone) from the list of products. The user may select the product by selecting, via the display screen or the selection device, a selectable name of the product, a selectable image of the product, a selectable description of the product, and/or the like. The user device 105 may receive the selection of the product, from the list of products, based the user utilizing the user device 105 to select the product.

Figure 1C:
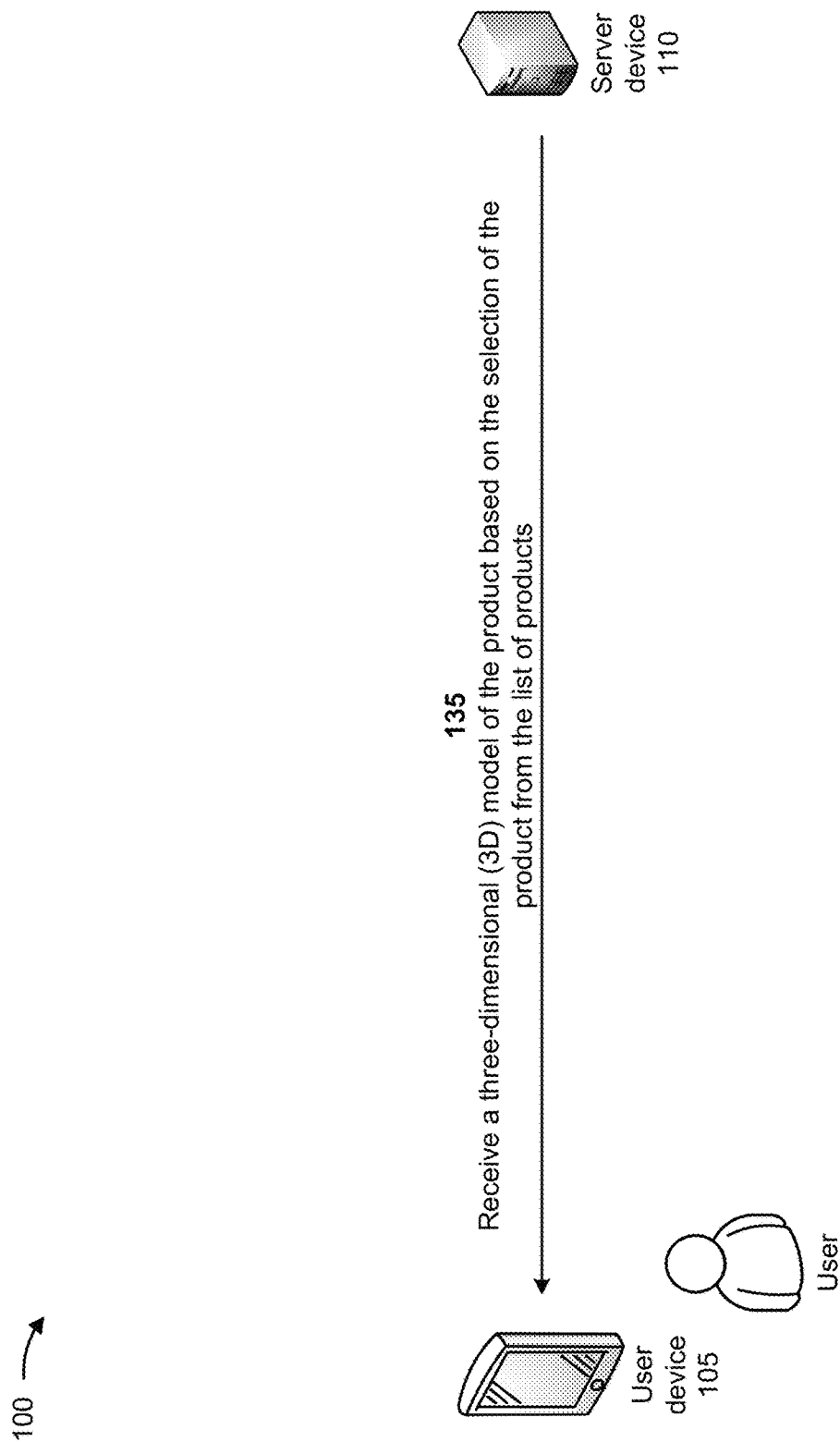

As shown in FIG. 1C, and by reference number 135, the user device 105 may receive, from the server device 110, a three-dimensional (3D) model of the product based on the selection of the product from the list of products. For example, the server device 110 may receive the selection of the product from the list of products, and may identify a 3D model of the product in a data structure (e.g., a database, a table, a list, and/or the like) of 3D models, based on the selection. The server device 110 may provide the 3D model of the product to the user device 105, and the user device 105 may receive the 3D model of the product from the server device 110. In some implementations, the user device 105 may request, from the server device 110, the 3D model of the product based on the selection of the product, and may receive the 3D model of the product from server device 110 based on the request. In some implementations, the user device 105 may download the 3D model of the product from the server device 110. In some implementations, the server device 110 may provide, to the user device 105, a link or a pointer to the 3D model that may be received or downloaded from another device. For example, the server device 110 may provide the link or the pointer to another server device that is geographically closer to the user device 105 so as to minimize bandwidth consumption over a long distance within a network.

Figure 1D:
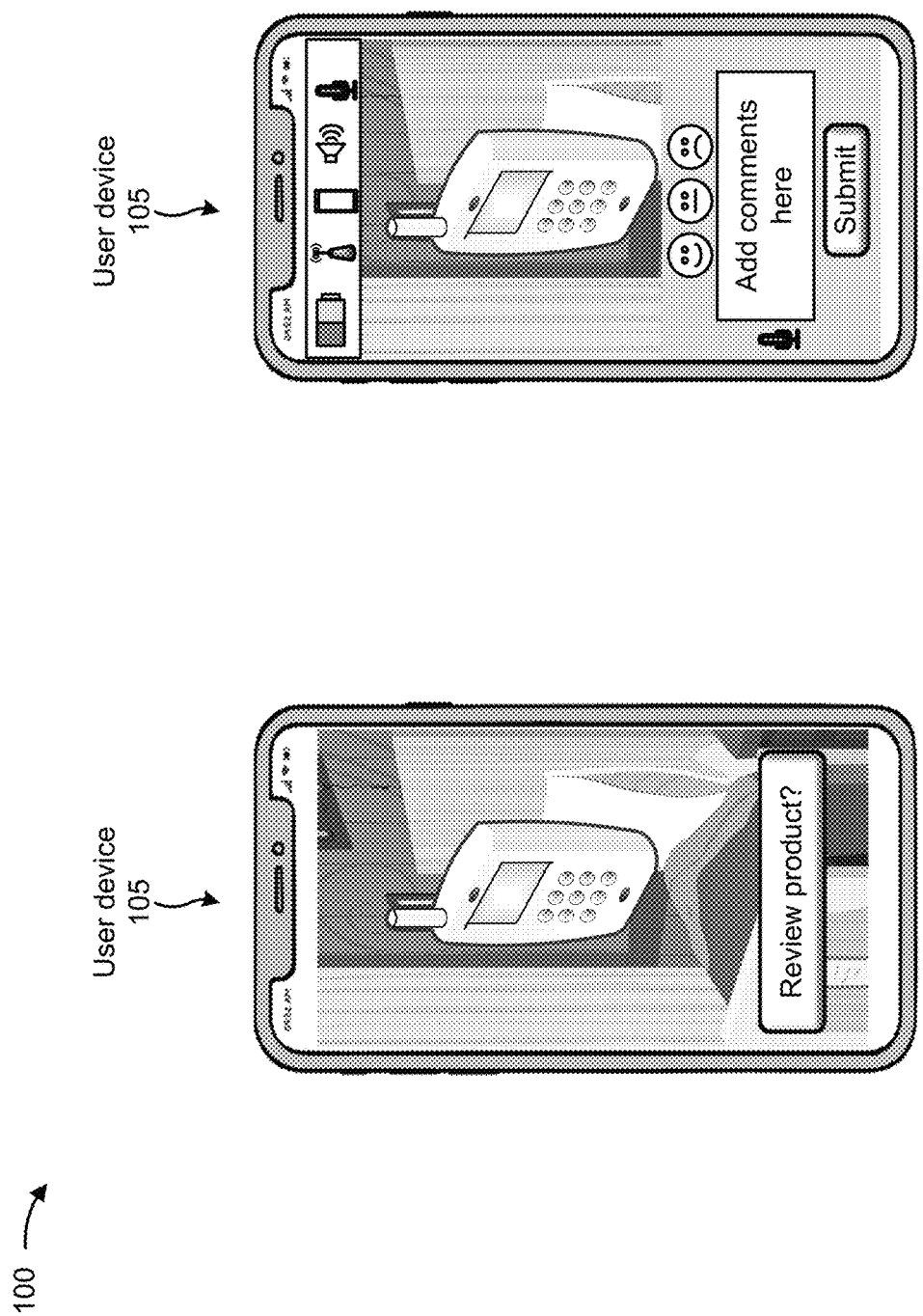

As shown in FIG. 1D, and by reference number 140, the user device 105 may provide the 3D model of the product, with a product review option, in an AR display (e.g., a user interface or UI). For example, the user device 105 may display the 3D model of the product, with the product review option and in augmented reality, on the display screen of the user device 105. The 3D model may include 3D representation of the product that may be manipulated by the user of the user device 105, as described below. The 3D model may be displayed by the user device 105 in an augmented reality display by displaying the 3D model on top of images captured by the camera of the user device 105. For example, as shown in FIG. 1D, the user device 105 may display the 3D model of the smartphone on top of an image of a room (e.g., a bedroom) being captured by the camera of the user device 105. The product review option may include a selection mechanism (e.g., a button, a link, a menu item, and/or the like) that, when selected by the user, causes the user device 105 to display a product feature review panel and product review features with the 3D model in the augmented reality display.

As further shown in FIG. 1D, and by reference number 145, the user device 105 may provide a product feature review panel and product review features, with the 3D model in the AR display, based on selection of the product review option. For example, when the user selects the product review option (e.g., via the selection mechanism), the user device 105 may display the product feature review panel and the product review features, with the 3D model and in augmented reality, on the display screen of the user device 105. In some implementations, when the user selects the product review option, the user device 105 may display the product feature review panel near the 3D model so that user may provide a review of the product or a product feature directly from the augmented reality display. The product feature review panel may include feature review components, such as a rating bar, emoticons, an editable comments field, icons of features of the product, and/or other user interface components that are helpful for providing a review of the product or a product feature. The product feature review panel may be based on a static user interface provided to and displayed by the user device 105, or based on a user interface driven by the server device 110 so as to provide a seamless experience for the user.

Figure 1E:
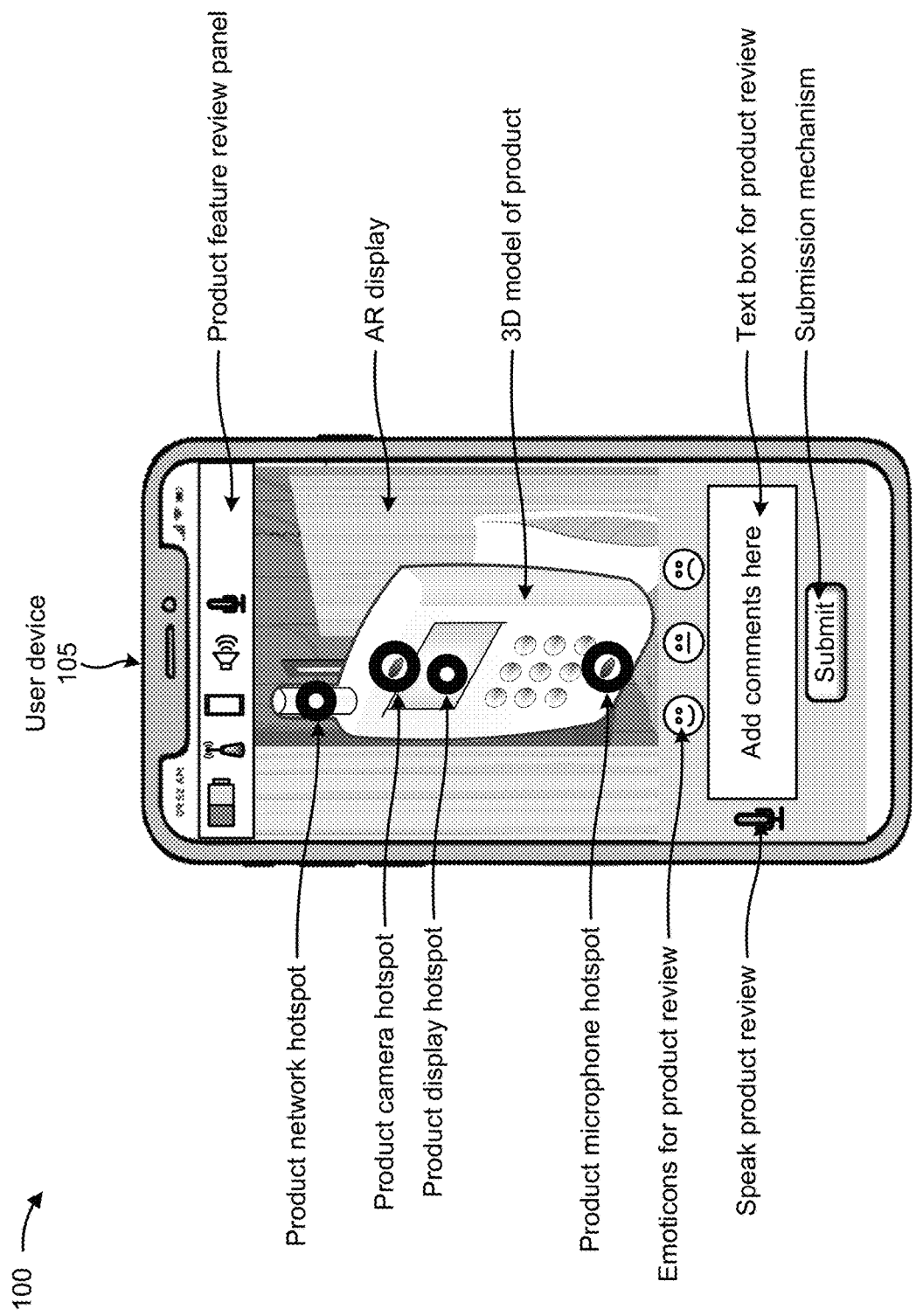

FIG. 1E is a user interface depicting the product feature review panel and the product review features, that the user device 105 may display with the 3D model in the augmented reality display. As shown, the user interface may include the 3D model of the product provided on top of the augmented reality display. The product feature review panel of the user interface may include icons of product features (e.g., a battery, a network, a display, a speaker, a microphone, and/or the like) of the product. The user interface may also include product feature hotspots displayed on the 3D model and associated with product features of the product. For example, the user interface may include a product network hotspot associated with the network, a product camera hotspot associated with the camera, a product display hotspot associated with the display, a product microphone hotspot associated with the microphone, and/or the like. The user may utilize the user device 105 to select or hover over one of the product feature hotspots so that a review of a product feature may be provided, as described below.

As further shown in FIG. 1E, the user interface may include a text box for entering a product review or a review of a product feature, and a selection mechanism (e.g., a microphone icon) that, when selected by the user, may enable the user to audibly enter (e.g., via the user device 105) the product review or the review of the product feature. The user interface may also include a submission mechanism (e.g., a button, a link, a menu item, and/or the like) that, when selected by the user, may cause the user device 105 to submit or provide a product review or a product feature review to the server device 110. In some implementations, the user may utilize hand gestures to manipulate the user interface (e.g., rotate the 3D model from all angles, resize the 3D model, change a position of the 3D model, and/or the like).

Figure 1F:
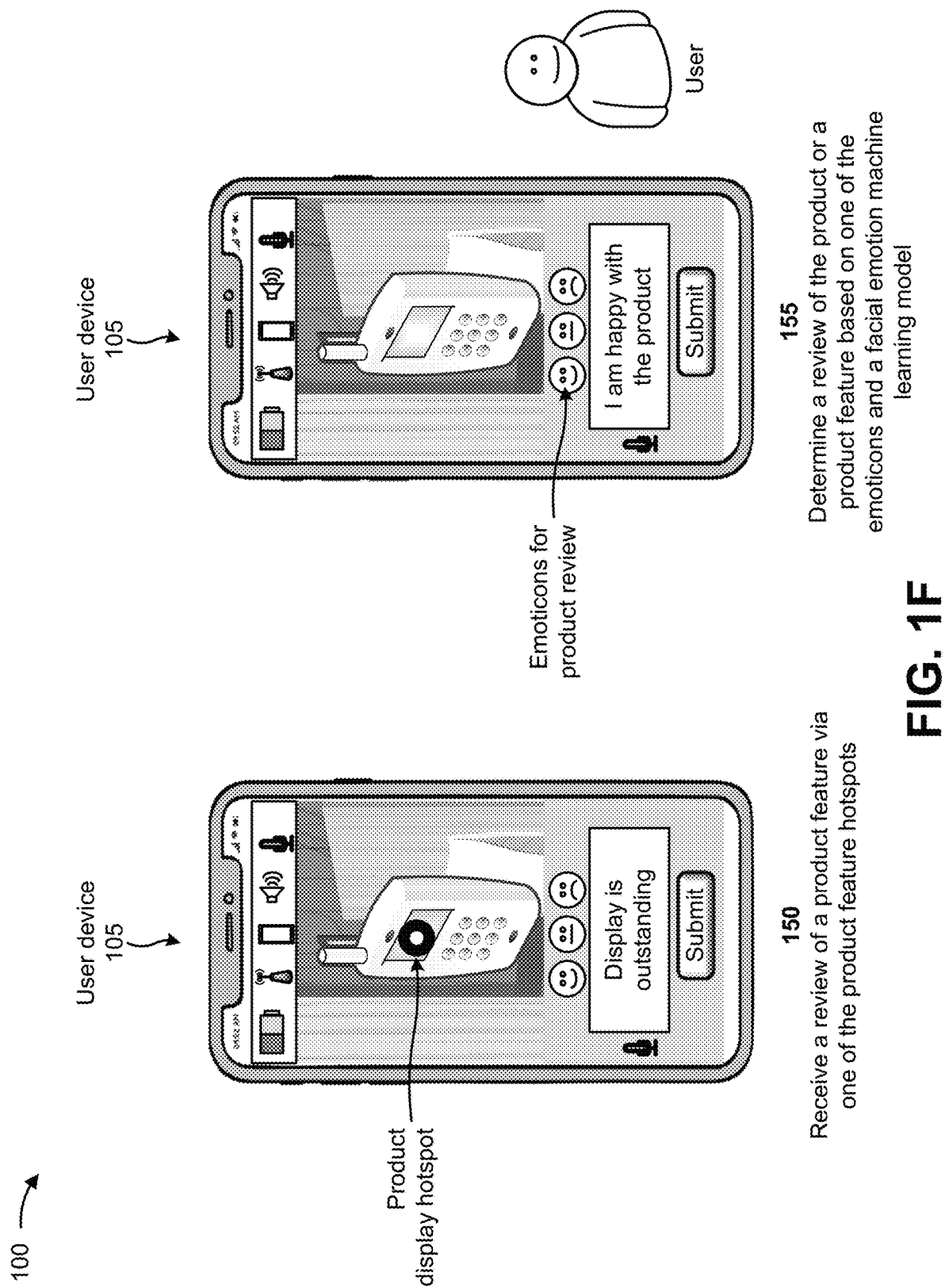

As shown in FIG. 1F, and by reference number 150, the user device 105 may receive a review of a product feature via one of the product feature hotspots. For example, the user may utilize the user device 105 to select one of the product feature hotspots (e.g., the product display hotspot). The user may utilize the user device 105 to enter or audibly speak a review of the product display, and the user device 105 may record the review in the text box. For example, the user may enter or speak the phrase "Display is outstanding," and the user device 105 may record the phrase in the text box. The user may utilize the user device 105 to edit the review of the product display. The user may utilize the user device 105 to select one or more other product feature hotspots so that the user may provide reviews of other product features. Alternatively, or additionally, the user may utilize the user device 105 to enter or speak a review of the overall product, and the user device 105 may record the overall product review in the text box. In some implementations, the user device 105 may utilize sentiment analysis software to suggest review scores for the product or product feature based on a sentiment that is detected by the user device 105 based on what the user says and/or a tone of the user's speech.

As further shown in FIG. 1F, and by reference number 155, the user device 105 may determine a review of the product or a product feature based on one of the emoticons and a facial emotion machine learning model. For example, the user may utilize the user device 105 to select one of the emoticons based on how the user feels about the product or a product feature. A smiling emoticon may indicate that the user is happy with the product or the product feature, a neutral emoticon may indicate that the user is neutral about the product or the product features, and a frowning emoticon may indicate that the user is unhappy with the product or the product features.

In some implementations, the camera of the user device 105 may capture an image of a facial expression of the user (e.g., at time selected by the user) that indicates how the user feel about the product or a product feature. For example, if the user smiles, the user device 105 may capture an image of the smile and may associate the smile with the smiling emoticon (e.g., indicating that the user is happy with the product or the product feature). If the user neither smiles nor frowns, the user device 105 may capture an image of the neutral facial expression and may associate the neutral expression with the neutral emoticon (e.g., indicating that the user is neutral about the product or the product feature). If the user frowns, the user device 105 may capture an image of the frown and may associate the frown with the frowning emoticon (e.g., indicating that the user is unhappy with the product or the product feature). In some implementations, the user device 105 may receive an image of a facial expression (e.g., smiling, neutral, or frowning) of the user, and may utilize a facial emotion machine learning model to process the facial expression and to determine a facial emotion (e.g., smiling, neutral, or frowning) associated with the product or the product feature. The user device 105 may update the emoticon (e.g., to the smiling emoticon, the neutral emoticon, or the frowning emoticon) to match the facial emotion and to generate an updated emoticon. The user device may determine the review of the product or the product feature based on the updated emoticon (e.g., happy, neutral, or unhappy with the product or the product feature).

As shown in FIG. 1G, and by reference number 160, the user device 105 may receive a review of a product feature via one of the icons in the product feature review panel. For example, the product feature review panel may include a list of product feature icons (e.g., even for product features that are internal to the product and not viewable by the 3D model) along with the selectable product feature hotspots. The user may utilize the user device 105 to select one of the product feature icons (e.g., the battery icon). The user may utilize the user device 105 to enter or audibly speak a review of the product battery, and the user device 105 may record the review in the text box. For example, the user may enter or speak the phrase "Battery life is ok," and the user device 105 may record the phrase in the text box. The user may utilize the user device 105 to edit the review of the product battery. The user may utilize the user device 105 to select one or more other product feature icons so that the user may provide reviews of other product features.

As further shown in FIG. 1G, and by reference number 165, the user device 105 may determine a review of the product or a product feature via a speech-to-text machine learning model. For example, the user may utilize the user device 105 to select the selection mechanism (e.g., the microphone icon). The selection mechanism, when selected by the user, may enable the user to audibly enter (e.g., via the user device 105) the product review or the review of the product feature. The user device 105 may convert the user's voice to text and may determine the review of the product or the product feature via a speech-to-text machine learning model. When determining the review of the product or the product feature via a speech-to-text machine learning model, the user device 105 may receive a voice input from the user, and may utilize the speech-to-text machine learning model to process the voice input and to identify spoken words associated with the product or the product feature. The user device 105 may determine the review of the product or the product feature based on the spoken words associated with the product or the product feature. The user device 105 may automatically provide the review of the product or the product feature in the text box.

Figure 1H:
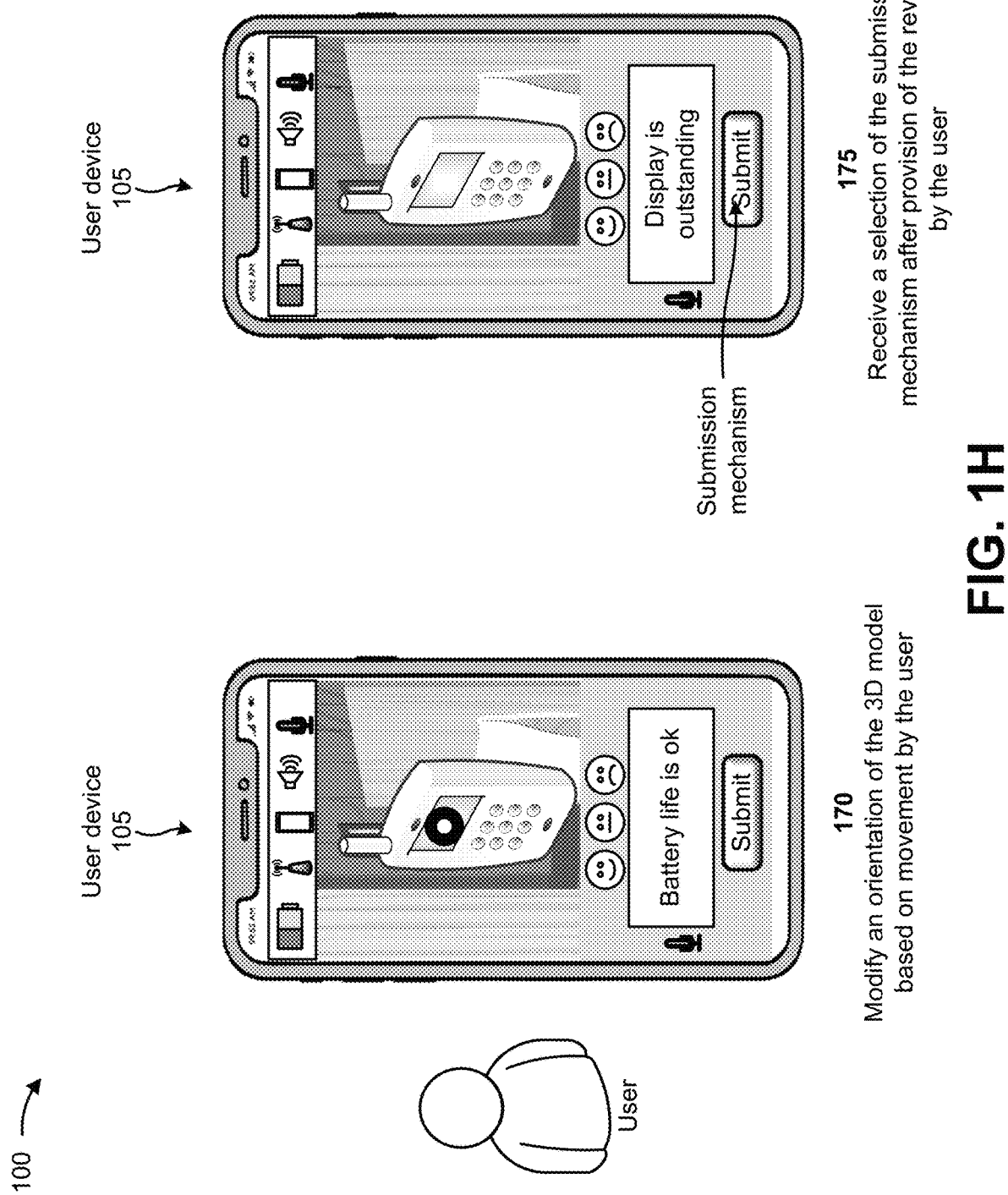

As shown in FIG. 1H, and by reference number 170, the user device 105 may modify an orientation of the 3D model based on movement by the user. For example, the user device 105 may detect a movement (e.g., a head gesture, a hand gesture, an eye gesture, a hand selection, an eye blink, and/or the like) of the user, and may modify an orientation of the 3D model in the augmented reality user interface based on the movement of the user. In some implementations, the movement of the user may include a rotation of the user's head to the left, a rotation of the user's head to the right, the user looking upward, the user looking downward, and/or the like. When modifying the orientation of the 3D model in the augmented reality user interface based on the movement of the user, the user device 105 may rotate the 3D model left when the user rotates the user's head to the left, may rotate the 3D model right when the user rotates the user's head to the right, may flip the 3D model upwards when the user looks upwards, may flip the 3D model downwards when the user looks downwards, and/or the like.

As further shown in FIG. 1H, and by reference number 175, the user device 105 may receive a selection of the submission mechanism after provision of the review(s) by the user. For example, after the user provides the product review and/or the product feature review(s), the user may select the submission mechanism. The user device 105 may detect the selection of the submission mechanism by the user.

Figure 1I:
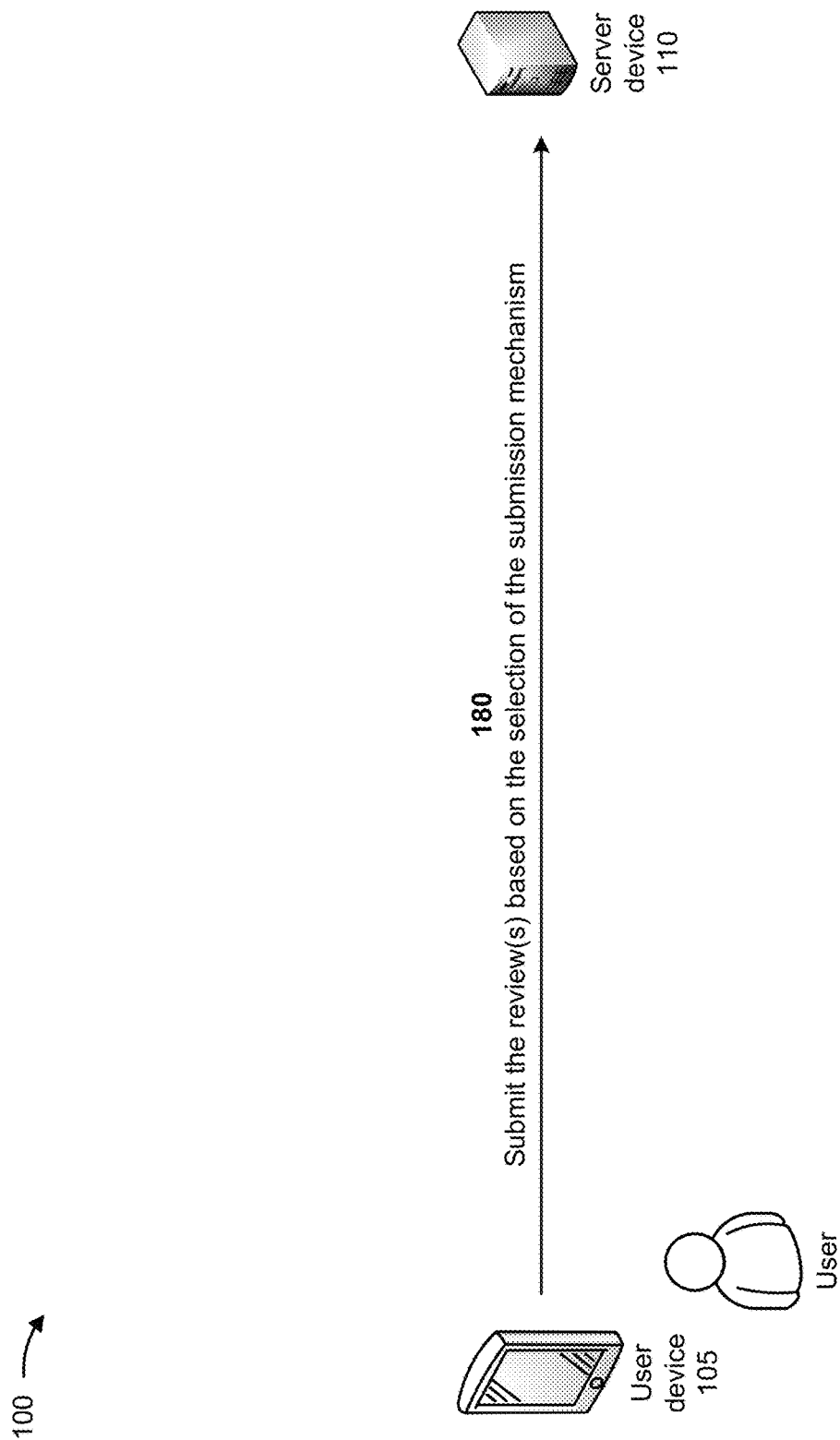

As shown in FIG. 1I, and by reference number 180, the user device 105 may submit the review(s) based on the selection of the submission mechanism. For example, the submission mechanism, when selected by the user, may cause the user device 105 to submit or provide the product review or the product feature review(s) to the server device 110. In this way, the server device 110 may quickly and easily receive comprehensive reviews of products and/or product features.

The augmented reality functionality provided by the user device 105 may enable the user to view product or product features reviews of other users, to dynamically enter product or product feature reviews. The user device 105 also enables the user to provide product or product feature reviews via voice commands, and to interact with the 3D models of the product via hand gestures, head gestures, eye gestures, face gestures, and/or the like. The 3D model of the product may provide the user with a real time look and feel of the actual product, and may provide minute details of the product and the product features so that the user may provide more comprehensive reviews. The user may utilize various face gestures and eye movements to control different views of the 3D model, which may enable the user to change a view of the 3D model without touching any specific input devices such as a keyboard, a mouse, a touch screen, and/or the like. In some implementations, the user may review a product in a vicinity of the user by providing a 3D model of the product in augmented reality via the user device 105. In some implementations, the server device 110 may aggregate review data for products and product features and may mine the review data to determine target marketing (e.g., emphasizing product features favored by customers), to prioritize product enhancements (e.g., to improve a product features not favored by customers), and/or the like.

In this way, the user device 105 utilizes augmented reality and voice commands to capture and display product reviews. For example, the user device 105 may provide augmented reality functionality that enables the user to see other customers' product reviews and to and dynamically generate product reviews via voice commands, face gestures, hand gestures, and/or the like. The user device 105 may capture and display such product reviews using augmented reality with a display component of the user device. The user device 105 may enable a user to interact with three-dimensional (3D) models of the products, displayed in augmented reality, by using face gestures, voice commands, and/or the like. Thus, the user device 105 may conserve computing resources, networking resources, and/or other resources that would have otherwise been consumed by the user typing in the information about the product, searching for and failing to locate useful product reviews about the product, providing product reviews that are not useful, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
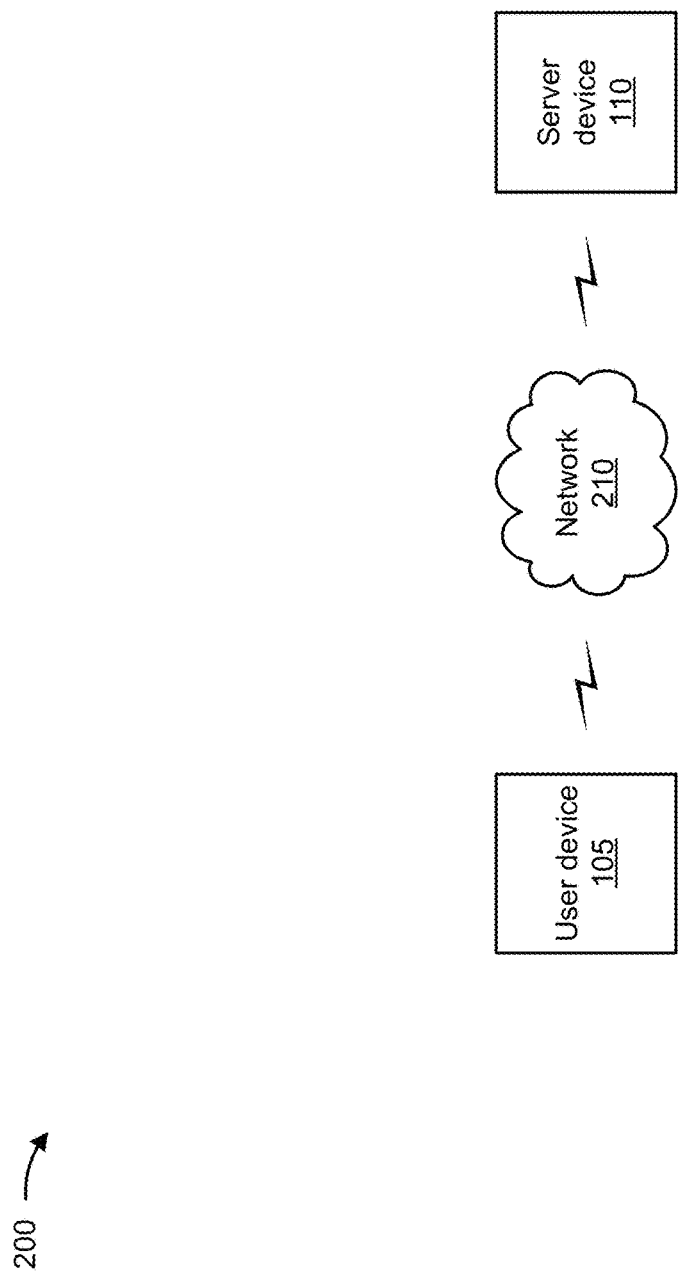
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the user device 105, the server device 110, and a network 210. Devices of the environment 200 may interconnect via wired connections, wireless connections, or a combination of wired and wireless connections.

The user device 105 includes one or more devices capable of receiving, generating, storing, processing, and/or providing information, as described elsewhere herein. The user device 105 may include a communication device. For example, the user device 105 may include a wireless communication device, a mobile phone, a laptop computer, a tablet computer, a gaming console, a set-top box, a wearable communication device (e.g., a smart wristwatch, a pair of smart eyeglasses, a head mounted display, or a virtual reality headset), or a similar type of device.

The server device 110 includes one or more devices capable of receiving, generating, storing, processing, and/or providing information, such as information described herein. For example, the server device 110 may include a laptop computer, a tablet computer, a desktop computer, a group of server devices, a cloud-based device, or a similar type of device. In some implementations, the server device 110 may receive information from and/or transmit information to the user device 105, via the network 210.

The network 210 includes one or more wired and/or wireless networks. For example, the network 210 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
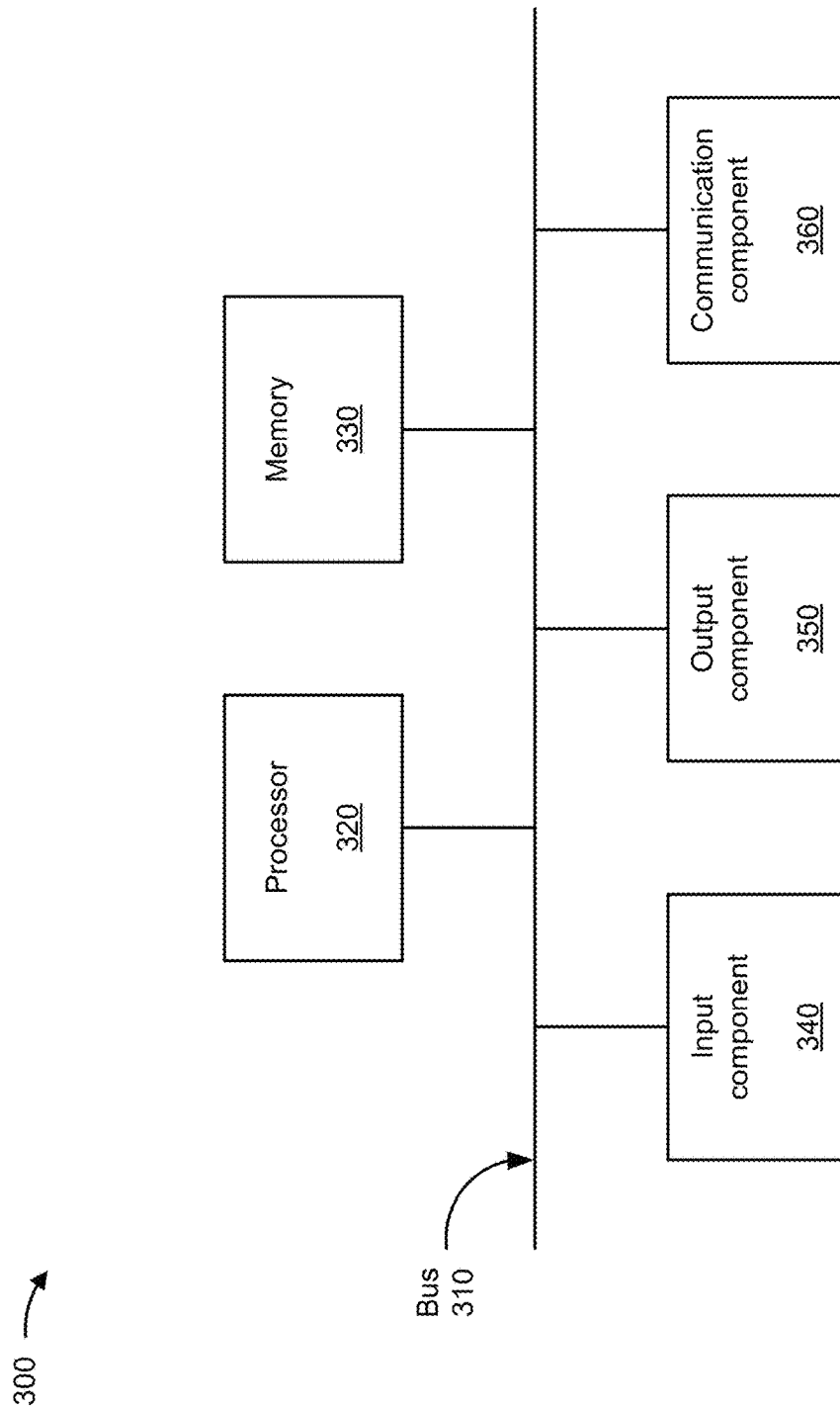
FIG. 3 is a diagram of example components of one or more devices of FIG. 2.

FIG. 3 is a diagram of example components of a device 300, which may correspond to the user device 105 and/or the server device 110. In some implementations, the user device 105 and/or the server device 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
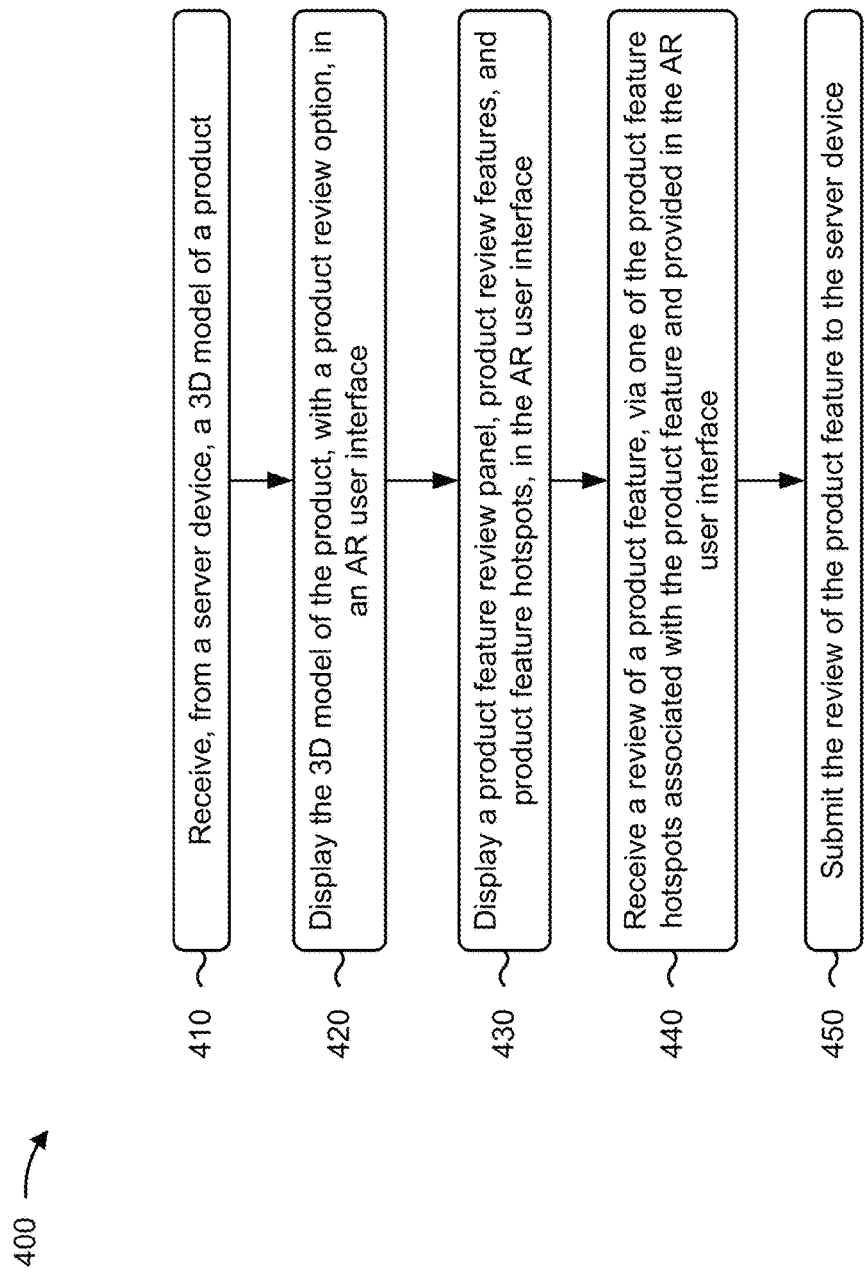
FIG. 4 is a flowchart of an example process for utilizing augmented reality and voice commands to capture and display product information.

FIG. 4 is a flowchart of an example process 400 for utilizing augmented reality and voice commands to capture and display product reviews. In some implementations, one or more process blocks of FIG. 4 may be performed by a device (e.g., the user device 105). In some implementations, one or more process blocks of FIG. 4 may be performed by another device or a group of devices separate from or including the device, such as a server device (e.g., the server device 110). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a server device, a three-dimensional model of a product (block 410). For example, the user device may receive, from a server device, a three-dimensional model of a product, as described above.

As further shown in FIG. 4, process 400 may include displaying the three-dimensional model of the product, with a product review option, in an augmented reality user interface (block 420). For example, the user device may display the three-dimensional model of the product, with a product review option, in an augmented reality user interface, as described above.

As further shown in FIG. 4, process 400 may include displaying a product feature review panel, product review features, and product feature hotspots, with the three-dimensional model in the augmented reality user interface, based on selection of the product review option (block 430). For example, the user device may display a product feature review panel, product review features, and product feature hotspots, with the three-dimensional model in the augmented reality user interface, based on selection of the product review option, as described above. In some implementations, the augmented reality user interface includes one or more of the three-dimension model of the product, the product feature hotspots identifying product features of the product, one or more emoticons for identifying reviews associated with the product or the product features, a voice mechanism configured to receive voice inputs, a textual mechanism configured to receive textual inputs, or a submission mechanism configured to submit the reviews to the server device. In some implementations, the product feature review panel includes one or more icons representing one or more product features of the product.

As further shown in FIG. 4, process 400 may include receiving a review of a product feature, via one of the product feature hotspots associated with the product feature and provided in the augmented reality user interface (block 440). For example, the user device may receive a review of a product feature, via one of the product feature hotspots associated with the product feature and provided in the augmented reality user interface, as described above.

As further shown in FIG. 4, process 400 may include submitting the review of the product feature to the server device (block 450). For example, the user device may submit the review of the product feature to the server device, as described above. In some implementations, submitting the review of the product feature to the server device includes receiving a selection of a submission mechanism provided in the augmented reality user interface, and submitting the review of the product feature to the server device based on the selection of the submission mechanism.

In some implementations, process 400 includes enabling an augmented reality experience prior to receiving the three-dimensional model of the product.

In some implementations, process 400 includes determining another review of another product feature based on an emoticon, provided in the augmented reality user interface, and based on a facial emotion machine learning model, and submitting the other review of the other product feature to the server device. In some implementations, determining the other review of the other product feature based on the emoticon includes detecting a facial expression of a user of the user device, utilizing the facial emotion machine learning model to process the facial expression and to determine a facial emotion associated with the other product feature, updating the emoticon to match the facial emotion and to generate an updated emoticon, and determining the review of the other product feature based on the updated emoticon.

In some implementations, process 400 includes receiving another review of another product feature, via an icon associated with the other product feature and provided in the product feature review panel, and submitting the other review of the other product feature to the server device.

In some implementations, process 400 includes detecting a movement of a user of the user device, and modifying an orientation of the three-dimensional model in the augmented reality user interface based on the movement of the user. In some implementations, modifying the orientation of the three-dimensional model in the augmented reality user interface based on the movement of the user includes one or more of rotating the three-dimensional model left when the user rotates a head of the user to the left, rotating the three-dimensional model right when the user rotates the head of the user to the right, flipping the three-dimensional model upwards when the user looks upwards, or flipping the three-dimensional model downwards when the user looks downwards. In some implementations, modifying the orientation of the three-dimensional model in the augmented reality user interface based on the movement of the user includes modifying the orientation of the three-dimensional model in the augmented reality user interface based on one of hand gestures, eye gestures, or hand selections of the user.

In some implementations, process 400 includes determining another review of the product or another product feature via a speech-to-text machine learning model, and submitting the other review of the other product feature to the server device. In some implementations, determining the other review of the product or the other product feature via the speech-to-text machine learning model includes receiving a voice input from a user of the user device, utilizing the speech-to-text machine learning model to process the voice input and to identify spoken words associated with the product or the other product feature, and determining the review of the product or the other product feature based on the spoken words associated with the product or the other product feature.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A user device, comprising:
one or more processors configured to:
enable an augmented reality experience for the user device;
receive a selection of a product from a list of products;
receive a three-dimensional model of the product based on the selection of the product from the list of products;
display the three-dimensional model of the product, with a product review option, in an augmented reality user interface;
detect a bodily movement of a user of the user device, wherein a bodily movement is one or more of hand gestures, eye gestures, or hand selections of the user;

modify an orientation of the three-dimensional model in the augmented reality user interface based on the bodily movement of the user;

display a product feature review panel and product review features, with the three-dimensional model in the augmented reality user interface, based on selection of the product review option;

determine a review of the product or a product feature based on an emoticon, provided in the augmented reality user interface, and a facial emotion machine learning model; and submit the review of the product or the product feature to a server device.

2. The user device of claim 1, wherein the product feature review panel includes one or more icons representing one or more product features of the product.

3. The user device of claim 1, wherein the one or more processors, to modify the orientation of the three-dimensional model in the augmented reality user interface based on the bodily movement of the user, are configured to:

rotate the three-dimensional model left when the user rotates a head of the user to the left, rotate the three-dimensional model right when the user rotates the head of the user to the right, flip the three-dimensional model upwards when the user looks upwards, or flip the three-dimensional model downwards when the user looks downwards.

4. The user device of claim 1, wherein the one or more processors are further configured to:

determine another review of the product or another product feature via a speech-to-text machine learning model; and submit the other review of the other product feature to the server device.

5. The user device of claim 4, wherein the one or more processors, to determine the other review of the product or the other product feature via the speech-to-text machine learning model, are configured to:

receive a voice input from a user of the user device;

utilize the speech-to-text machine learning model to process the voice input and to identify spoken words associated with the product or the other product feature; and determine the review of the product or the other product feature based on the spoken words associated with the product or the other product feature.

6. The user device of claim 1, wherein the one or more processors, to determine the review of the product or the product feature based on the emoticon, are to:

detect a facial expression of a user of the user device;

utilize the facial emotion machine learning model to process the facial expression and to determine a facial emotion associated with the product or the product feature;

update the emoticon to match the facial emotion and to generate an updated emoticon; and determine the review of the product or the product feature based on the updated emoticon.

7. The user device of claim 1, wherein the one or more processors are further to:

receive another review of another product feature, via an icon associated with the other product feature and provided in the product feature review panel; and submit the other review of the other product feature to the server device.

8. A non-transitory computer-readable medium storing a set of instructions, the set of instructions comprising:

one or more instructions that, when executed by one or more processors of a user device, cause the user device to:

receive, from a server device, a list of products;

display the list of products;

receive a selection of a product from the list of products;

receive, from the server device, a three-dimensional model of the product based on the selection of the product from the list of products;

display the three-dimensional model of the product, with a product review option, in an augmented reality user interface;

detect a bodily movement of a user of the user device, wherein a bodily movement is one or more of hand gestures, eye gestures, or hand selections of the user;

modify an orientation of the three-dimensional model in the augmented reality user interface based on the bodily movement of the user;

display a product feature review panel and product review features, with the three-dimensional model in the augmented reality user interface, based on selection of the product review option;

determine a review of the product or a product feature based on an emoticon, provided in the augmented reality user interface, and a facial emotion machine learning model;

receive a selection of a submission mechanism provided in the augmented reality user interface; and submit the review of the product or the product feature to the server device based on the selection of the submission mechanism.

9. The non-transitory computer-readable medium of claim 8, wherein the one or more instructions further cause the user device to:

receive another review of another product feature, via a product feature hotspot associated with the other product feature and provided in the augmented reality user interface; and submit the other review of the other product feature to the server device.

10. The non-transitory computer-readable medium of claim 8, wherein the one or more instructions, that cause the user device to determine the review of the product or the product feature based on the emoticon, cause the user device to:

detect a facial expression of a user of the user device;

utilize the facial emotion machine learning model to process the facial expression and to determine a facial emotion associated with the product or the product feature;

update the emoticon to match the facial emotion and to generate an updated emoticon; and determine the review of the product or the product feature based on the updated emoticon.

11. The non-transitory computer-readable medium of claim 8, wherein the one or more instructions further cause the user device to:

receive another review of another product feature, via an icon associated with the other product feature and provided in the product feature review panel; and submit the other review of the other product feature to the server device.

12. The non-transitory computer-readable medium of claim 8, wherein the one or more instructions further cause the user device to:
   determine another review of the product or another product feature via a speech-to-text machine learning model; and
   submit the other review of the other product feature to the server device.

13. The non-transitory computer-readable medium of claim 8, wherein the one or more instructions, to modify the orientation of the three-dimensional model in the augmented reality user interface based on the bodily movement of the user, cause the user device to:
   rotate the three-dimensional model left when the user rotates a head of the user to the left,
   rotate the three-dimensional model right when the user rotates the head of the user to the right,
   flip the three-dimensional model upwards when the user looks upwards, or
   flip the three-dimensional model downwards when the user looks downwards.

14. A method, comprising:
   enabling, by a user device, an augmented reality experience for the user device;
   receiving, by the user device, a selection of a product from a list of products;
   receiving, by the user device, a three-dimensional model of the product based on the selection of the product from the list of products;
   displaying, by the user device, the three-dimensional model of the product, with a product review option, in an augmented reality user interface;
   detecting, by the user device, a bodily movement of a user of the user device,
      wherein a bodily movement is one or more of hand gestures, eye gestures, or hand selections of the user;
   modifying, by the user device, an orientation of the three-dimensional model in the augmented reality user interface based on the bodily movement of the user;
   displaying, by the user device, a product feature review panel and product review features, with the three-dimensional model in the augmented reality user interface, based on selection of the product review option;
   determining, by the user device, a review of the product or a product feature based on an emoticon, provided in the augmented reality user interface, and a facial emotion machine learning model; and
   submitting, by the user device, the review of the product or the product feature to a server device.

15. The method of claim 14, wherein the product feature review panel includes one or more icons representing one or more product features of the product.

16. The method of claim 14, wherein modifying the orientation of the three-dimensional model in the augmented reality user interface based on the bodily movement of the user comprises:
   rotating the three-dimensional model left when the user rotates a head of the user to the left,
   rotating the three-dimensional model right when the user rotates the head of the user to the right,
   flipping the three-dimensional model upwards when the user looks upwards, or
   flipping the three-dimensional model downwards when the user looks downwards.

17. The method of claim 14, further comprising:
   determining another review of the product or another product feature via a speech-to-text machine learning model; and
   submitting the other review of the other product feature to the server device.

18. The method of claim 17, wherein determining the other review of the product or the other product feature via the speech-to-text machine learning model comprises:
   receiving a voice input from a user of the user device;
   utilizing the speech-to-text machine learning model to process the voice input and to identify spoken words associated with the product or the other product feature; and
   determining the review of the product or the other product feature based on the spoken words associated with the product or the other product feature.

19. The method of claim 17, wherein determining the review of the product or the product feature based on the emoticon comprises:
   detecting a facial expression of a user of the user device;
   utilizing the facial emotion machine learning model to process the facial expression and to determine a facial emotion associated with the product or the product feature;
   updating the emoticon to match the facial emotion and to generate an updated emoticon; and
   determining the review of the product or the product.

20. The method of claim 14, further comprising:
   receiving another review of another product feature, via an icon associated with the other product feature and provided in the product feature review panel; and
   submitting the other review of the other product feature to the server device.

* * * * *